March 3, 1953 C. W. KECK 2,629,908
HOSE CLAMP
Filed Dec. 11, 1950

INVENTOR.
Cecil W. Keck
BY
Hamilton & Hamilton
Attorneys.

Patented Mar. 3, 1953

2,629,908

UNITED STATES PATENT OFFICE 2,629,908

HOSE CLAMP

Cecil W. Keck, Cartersville, Mo.

Application December 11, 1950, Serial No. 200,259

7 Claims. (Cl. 24—20)

This invention relates to new and useful improvements in hose clamps, and has particular reference to a hose clamp of the spring type.

The principal object of the present invention is the provision of a hose clamp comprising a resiliently contractable loop adapted to be positioned about a hose to clamp said hose to a tubular conduit inserted in said hose, and having novel means whereby said loop may be manually expanded and secured in its expanded position, thereby facilitating the easy and convenient positioning of the clamp in proper relation to the hose and conduit before said securing means is released to cause said clamp to operatively engage the hose.

Other objects are extreme simplicity and economy of construction, convenience and dependability of operation, and adaptability for use in a wide variety of applications.

With these objects in view, as well as other objects which will appear in the course of the specification, reference will be had to the drawing, wherein.

Like numerals apply to similar parts throughout the several views, and the numeral 2 applies to a hose clamp comprising a single length of heavy spring steel wire, preferably round in cross-section, bent to form a substantially circular loop. The end portions of said wire overlap, being offset in a direction parallel to the axis of the loop, and the end sections of said overlapping portions are bent outwardly to form operating arms 4 and 6, said arms being disposed substantially radially to the loop. It is apparent that arms 4 and 6 may be grasped and drawn closer together by a tool such as an ordinary pair of pliers, and that when this is done the loop will be expanded to a larger diameter. While being thus held in an expanded position, the loop may be disposed about a hose 8 into which a pipe or other tubular conduit 10 has been inserted. Arms 4 and 6 may then be released, whereupon the clamp will contract resiliently to compress the hose about said pipe to form a fluid-tight connection.

The clamp as so far described is well known, and has been found to have several disadvantages in use. The spring pressure of the clamp is necessarily quite heavy in order to perform its function efficiently, and is rather difficult to hold expanded by manual means, particularly while installing the clamp in a relatively inaccessible location, such as for example in making the radiator hose connections in an automobile. This difficulty is further increased by the fact that considerable handling and manipulation of the clamp in its expanded position is required. The clamp must first be placed over the hose, the hose placed over the conduit, and the clamp slid along the hose to a position coinciding with the conduit, before the clamp can be permitted to contract. Altogether, this clamp while possessing definite advantages, has been difficult, irritating, and exasperating to use.

Special tools have been developed for handling clamps of this type, such tools usually being special pliers having grooves in their jaws for engaging and preventing slippage of the clamp arms, and means for fixing the pliers whereby the clamp may be held expanded without manual effort while it is being manipulated into position. This invention contemplates the foundation of the clamp in such a manner that it may be expanded and secured in its expanded position without special tools, whereby it may be handled freely and easily as it is being installed.

Figure 1:
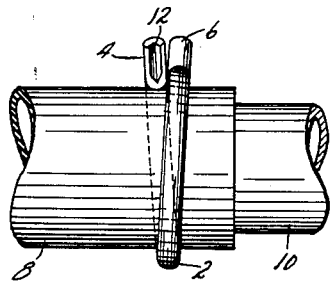
Fig. 1 is a fragmentary side elevation of a hose connection including a hose clamp embodying the present invention.
Figure 2:
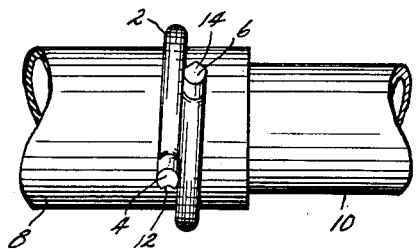
Fig. 2 is a plan view of the parts shown in Fig. 1.
Figure 3:
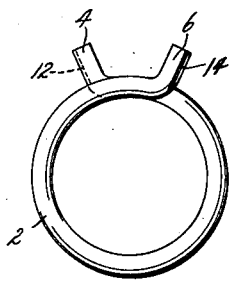
Fig. 3 is a front elevation of the clamp, shown in its contracted or operative position.
Figure 4:
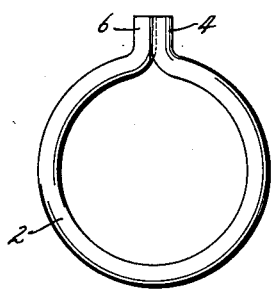
Fig. 4 is a view similar to Fig. 3 showing the clamp in its expanded or inoperative position.
Figure 5:
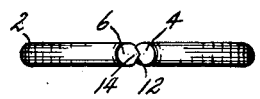
Fig. 5 is a top edge view of the clamp as shown in Fig. 4.
Figure 6:
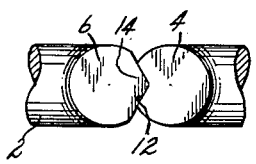
Fig. 6 is a fragmentary view similar to Fig. 5, enlarged to show in detail the configuration of the loop end portions.

According to the preferred form of my invention, as shown in Figs. 1 to 6, the normally distal sides of operating arms 4 and 6, which are substantially radial to the loop, are formed respectively to present a longitudinally extending groove 12 and a longitudinally extending rib 14, said groove and rib having a matching obtuse V-shaped in cross-section. With an ordinary pair of pliers, arms 4 and 6 may be brought into side by side relation, wherein they are spaced apart in a direction parallel to the axis of the loop. Then with a twisting motion of the pliers, arms 4 and 6 may be moved around each other to the position shown in Figs. 4, 5, and 6, whereupon rib 14 snaps into groove 12 under heavy pressure. Since the arms bear heavily against each other as they move around each other to this position, it is important that said arms be substantially circular in cross-section for easy operation. The clamp is then securely held in the open or expanded position, as shown in Figs. 4 to 6, and can be handled freely without necessity of maintaining any manual pressure to hold it open, and without danger of injury to the hands or fingers. When the clamp has been positioned properly with respect to the hose and conduit, arms 4 and 6 are twisted out of engagement with a pair of pliers, whereupon the clamp contracts resiliently to grip the hose tightly. It is contemplated that the clamp be sold or furnished in the expanded position, although this is not essential. It will be noted that the cross-sectional angle of groove 12 and rib 14 is relatively obtuse, in order that they may be disengaged easily, and in order that the edges thereof will not be materially damaged by the repeated application of pliers thereto.

Figure 7:
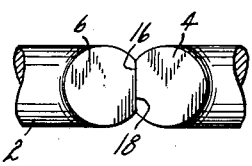
Fig. 7 is a view similar to Fig. 6 showing a modified form of my invention.

In the modification shown in Fig. 7, in place of the groove 12 and rib 14 of the preferred form, the normally distal sides of arms being formed respectively to present flats 16 and 18 in radial planes of the loop. Although this modification does not positively secure the arms against relative movement parallel to the axis of the loop, it has the advantage of making the arms more easily disengageable, and would be entirely acceptable in many circumstances. In this modification, the substantial frictional load between flats 16 and 18 is in most instances sufficient to retain said flats in engagement and to prevent accidental closing of the clamp. Also the clamp may be originally formed all in one plane, so that the resilience of the clamp material itself will resist movement of the arms out of engagement with each other.

Figure 8:
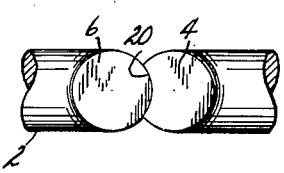
Fig. 8 is a view similar to Fig. 6 showing a second modification of my invention.

In the modification shown in Fig. 8, arm 6 is not specially formed in any way, being uniformly round throughout its length. Arm 4, along the side thereof normally away from arm 6, is formed to present an arcuate longitudinal groove 20, the curvature thereof being substantially equal to that of the round stock from which the clamp is formed. Its operation is similar to that of the preferred form, but it has the advantage of requiring special formation of only one of the arms.

Thus it is apparent that a hose clamp having several advantages has been produced. It is extremely simple and economical to produce, comprising a single unitary part which may be formed easily by standard processes. It is convenient and dependable in operation, and requires only an ordinary pair of pliers for manipulation. It is very durable and can be used many times. It cannot be easily damaged, nor are there working parts subject to wear.

Although I have shown specific embodiments of my invention, it is apparent that minor changes of construction and operation could be made without departing from the spirit of the invention.

What I claim as new and desire to protect by Letters Patent is:

1. A hose clamp comprising a length of resilient material formed to present a loop with the end portions thereof overlapping, said overlapping portions being relatively offset in a direction parallel to the axis of said loop, and with the extreme end portions turned outwardly to present substantially radial arms, the normally distal sides of said arms being formed respectively to present mating surfaces disposed generally transversely to the plane of the loop, whereby when said loop is expanded resiliently to its normally open position and said arms moved into coplanar relation with said loop, said mating surfaces will engage to secure said loop in its expanded position.

2. A hose clamp comprising a length of resilient wire of round cross-section formed to present a loop with the end portions thereof overlapping, said overlapping portions being relatively offset in a direction parallel to the axis of said loop, and with the extreme end portions turned outwardly to present substantially radial arms, the normally distal sides of said arms being formed respectively to present mating surfaces disposed generally transversely to the plane of the loop, whereby when said loop is expanded resiliently to its normally open position and said arms moved into coplanar relation with said loop, said mating surfaces will engage to secure said loop in its expanded position.

3. A hose clamp comprising a length of round resilient wire formed to present a substantially circular loop with the end portions overlapping and offset in a direction parallel to the axis of said loop, and with the extreme end portions turned outwardly to present substantially radial arms, the side of one of said arms normally distant from the other of said arms having a longitudinal groove formed therein, whereby when said loop is expanded resiliently to its normally open position and said arms are moved into coplanar relation with said loop, said other arm will be engaged by said grooved arm to secure said loop in its expanded position.

4. A hose clamp comprising a length of round resilient wire formed to present a substantially circular loop with the end portions overlapping and offset in a direction parallel to the axis of said loop, and with the extreme end portions turned outwardly to present substantially radial arms, the normally distal sides of said arms being formed respectively to present a longitudinal V-shaped groove and a matching V-shaped rib, whereby when said loop is expanded resiliently to its normally open position and said arms moved into coplanar relation with said loop, said rib will be engaged in said groove to secure said loop in its expanded position.

5. A hose clamp comprising a length of round resilient wire formed to present a substantially circular loop with the end portions overlapping and offset in a direction parallel to the axis of said loop, and with the extreme end portions turned outwardly to present substantially radial arms, the normally distal sides of said arms being formed respectively to present a longitudinal V-shaped groove and a matching V-shaped rib, said V-shaped groove and rib having a widely obtuse included angle.

6. A hose clamp comprising a length of round resilient wire formed to present a substantially circular loop with the end portions overlapping and offset in a direction parallel to the axis of said loop, and with the extreme end portions turned outwardly to present substantially radial arms, the normally distal sides of said arms being formed respectively to present flat surfaces disposed substantially in radial planes of said loop, whereby said loop is resiliently distended and said flat surfaces moved into engagement, the friction between said flat surfaces will secure the clamp releasably in an open position.

7. A hose clamp comprising a length of round resilient wire formed to present a substantially circular loop with the end portions overlapping and offset in a direction parallel to the axis of said loop, and with the extreme end portions turned outwardly to present substantially radial arms, the side of one of said arms normally distant from the other of said arms having a transversely arcuate groove formed longitudinally therein, said groove being substantially less than semi-circular and having a radius of curvature substantially equal to that of the round wire stock from which the clamp is formed.

CECIL W. KECK.

REFERENCES CITED

The following references are of record in the file of this patent:

UNITED STATES PATENTS

| Number | Name | Date |
| --- | --- | --- |
| 2,180,271 | Arras | Nov. 14, 1939 |

FOREIGN PATENTS

| Number | Country | Date |
| --- | --- | --- |
| 461,048 | Great Britain | Feb. 9, 1937 |